United States Patent [19]

Fleet et al.

[11] 4,108,754
[45] Aug. 22, 1978

[54] CARBON FIBER ELECTRODE

[75] Inventors: Bernard Fleet, London; Sankar Das Gupta, New Malden, both of England

[73] Assignee: Ontario Limited, Toronto, Canada

[21] Appl. No.: 810,246

[22] Filed: Jun. 27, 1977

Related U.S. Application Data

[62] Division of Ser. No. 599,457, Jul. 28, 1975, Pat. No. 4,046,663.

[51] Int. Cl.$^2$ .................. C25B 11/02; C25B 11/12; C25B 9/00
[52] U.S. Cl. ........................... 204/263; 204/275; 204/294
[58] Field of Search ............. 204/275, 263, 294, 109

[56] References Cited

U.S. PATENT DOCUMENTS

| | | | |
|---|---|---|---|
| 2,563,903 | 8/1961 | Zadra | 204/109 X |
| 3,457,152 | 7/1969 | Maloney, Jr. et al. | 204/275 X |
| 3,516,916 | 6/1970 | Ackermann | 204/263 X |
| 3,953,313 | 4/1976 | Levenson | 204/109 X |

*Primary Examiner*—John H. Mack
*Assistant Examiner*—D. R. Valentine
*Attorney, Agent, or Firm*—Rogers, Bereskin & Parr

[57] ABSTRACT

The invention provides an electrode for use in an electrochemical reactor. The electrode comprising a plurality of carbon fibers in close proximity to one another, each of the fibers being in electrical contact with at least several of the other carbon fibers for transmitting an electrical potential substantially throughout the electrode when the electrode is in use in the reactor.

5 Claims, 8 Drawing Figures

CARBON FIBER ELECTRODE

This application is a divisional of U.S. patent application Ser. No. 599,457 filed on July 28, 1975, now U.S. Pat. No. 4,046,663.

This invention relates to improvements in electrochemical reactors, and more particularly to an improved electrode for use in such reactors.

Electrochemical reactors are used in many different processes and consequently there are a great number of different structures in use. Among these processes are electrochemical synthesis, electrolysis, electrorefining, electrowinning, electrometallurgy, electrogeneration of chemical species, and electrochemical treatment of waste.

The efficiency of any electrochemical reactor is related closely to the characteristics of the working electrode and more particularly to the surface area of this electrode and the distribution of electrical potential on the surface of the electrode. If the surface area in contact with the electrolyte is maximised the electrode will be capable of creating a large mass transfer flux, and if the potential is constant across the surface area, the electrode will be controllable to be highly selective and thereby ensure that desired results can be achieved. Consequently because the economic and commercial viability of any electrochemical process depends to a large extent on the efficiency of the reactor, any improvement in the performance of a reactor would significantly influence the cost of operating the process.

Different electrode designs have been attempted to optimize reactor efficiency, but in general an improvement in surface area has not resulted in an improvement in potential distribution and vice versa. One design provides an electrode consisting of a particulate bed. A significant increase in surface area is achieved but the potential distribution is somewhat unpredictable due to poor mechanical contact which results in a potential drop between adjacent particles. As a result the potential distribution varies and consequently the advantages resulting from increased surface area tend to be diminished or cancelled by the poor potential distribution. An example of such a structure is found in U.S. Pat. No. 3,827,964 to Katsuhiro Okubo et al.

Another design provides a fluidized bed electrode. Here again poor electrical contacts between the particles results in inter-particulate potential drop with consequent extreme non-uniformity of potential over the fluidized bed electrode. Nevertheless the potential is not sufficiently predictable to permit accurate control of the electrode so that the advantages of improved surface area are again offset by poor potential distribution.

Apart from attempts to use various forms of granular or particulate beds, the approach to optimizing electrode efficiency has been to devise various arrangements of sheets and the like to create multi-plate electrodes separated by small spaces. Apart from the poor area achieved when compared with granular beds, the structures suffer from a further disadvantage in that the small spaces tend to become blocked and are difficult to arrange for adequate electrolyte flow. Most designs of this type which offer reasonable efficiency include devices for stirring the electrolyte or otherwise forcing the electrolyte through the electrode.

It is an object of the present invention to provide an improved electrode for use in an electrochemical reactor, the electrode having enhanced potential distribution characteristics as well as a high surface area to volume ratio.

Accordingly the invention provides an electrode for use in an electrochemical reactor, the electrode comprising a plurality of carbon fibers in close proximity to one another, each of the fibers being in electrical contact with at least several of the other carbon fibers for transmitting an electrical potential substantially throughout the electrode when the electrode is in use in the reactor.

In this context the term "carbon fiber" is used to describe all fibers which are prepared by various heat treatment methods from suitable organic precursors such as rayon or polyacrylonitrile fibers.

The invention will be better understood with reference to the drawings in which.

Figure 1:
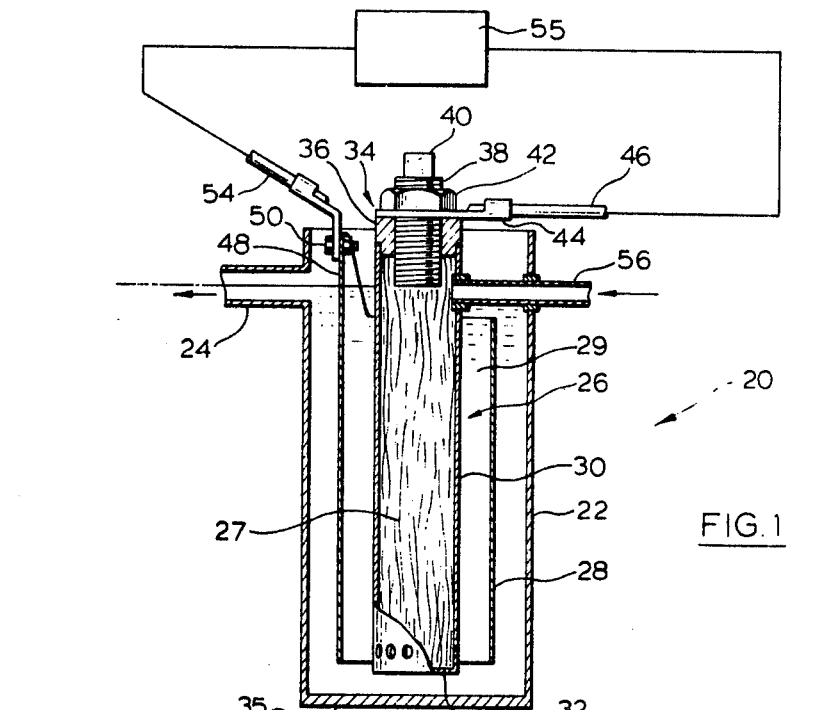
FIG. 1 is a diagrammatic representation of a cross-section of an electrochemical reactor incorporating an embodiment of an electrode incorporating the inventive concept.

Reference is first made to FIG. 1 which illustrates a simple embodiment of a reactor 20 including an electrolyte container 22 which is open at its top and which defines an electrolyte outlet 24 adjacent the open top. This outlet controls the electrolyte level in the container 22.

The reactor also includes a working electrode 26 filled with carbon fibers 27 and located centrally within the container 22. The electrode 26 is positioned inside a tubular counter electrode 28 and has a housing 29 which includes a generally cylindrical main portion 30 of asbestos or the like having a bottom 32, and a top assembly 34. The portion 30 defines a plurality of small openings 35 adjacent bottom 32 to permit electrolyte to escape from the housing 29. The openings are small compared with the length of a carbon fiber 27 so that the fibers tend to lie across the openings so that there is little likelihood of a fiber escaping from the housing 29.

The top assembly 34 consists of an annular element 36 which fits snugly in the upper end of the main portion 30 and which is attached thereto by any suitable adhesive.

The element 36 in top assembly 34 is threaded internally to receive an externally threaded compression element 38 having an upper square portion 40 for combining with a wrench to turn the element 38 in the annular element 36. A lock nut 42 is also provided and this serves to retain an electrical connector 44 in position as well as to lock the compression element 38 in a preferred position in the annular element 36. The connector 44 is coupled to an end of an insulated conductor 46.

The counter electrode 28 includes an upwardly extending portion 48 which is connected by a fastener 50 to a further electrical connector 52. This connector receives another insulated conductor 54 which, as indicated diagrammatically, forms part of an electrical power circuit having a power source 55 and which is also connected to the conductor 46.

An electrolyte inlet 56 is provided to carry electrolyte directly from outside the reactor 20 into the inside of the working electrode 26. Here the electrolyte meets the carbon fibers before passing through openings 35 in the main portion 30 and then moving past the counter electrode 28 and hence out through the outlet 24.

The electrode 26 is shown in a form in which the assembly is carried out as follows. Firstly the carbon fibers are positioned in the main portion 30 and then the top assembly 34 is engaged on the upper extremity of the main portion 30. For convenience, the carbon fibers are bunched quite closely and have a length comparable with that of the main portion 30. Once the annular element 36 is in place on the portion 30, the compression element 38 is threaded into the element 36 using a wrench on the square portion 40 of the element 38. This creates a compression in the carbon fibers sufficient to hold them in compressive engagement with one another because although the fibers are of small diameter, they are quite rigid for their size. Consequently, with adequate packing in the housing 29 the fibers will engage one another when a compressive load is created at one end of the housing thereby ensuring electrical contact between the fibers. Also, because of the negligible electrical resistance of the fibers and the numerous contacts between any one fiber and adjacent fibers, there is effectively a constant electrical potential throughout the fibers. Once the compression has been achieved, the electrical connector 44 is engaged in the compression element 38 and the lock nut 42 is engaged to hold both the element 38 and the connector 44 in position.

In use, a power supply will be chosen according to the process being used. If cations are to be collected, then the working electrode 26 will be the cathode. Conversely, if anions are to be collected, then the working electrode will be the anode.

The form of the working electrode can be varied without deviating from the present invention. The length of the fibers is preferably comparable to that of the length of the main portion 30. However the length can be varied consistent with providing sufficient electrical contacts between the fibers without severely restricting the flow of electrolyte between the fibers. It will be evident that if the length of the fibers is reduced, a size will be approached where the compaction of the fibers will severely affect the flow of electrolyte.

It has been found that carbon fiber electrodes of the type described are extremely efficient due primarily to the negligible electrical resistance within each fiber so that a substantially constant potential can be achieved in the fibers, and also because of the extremely large surface area achieved by the use of these fibers in a given size of electrode. Typical suitable carbon fibers are made by Courtaulds Limited, Carbon Fibers Unit, Coventry, England, and sold under the trade mark GRAFIL. Each of these fibers is typically about 5 to 15 microns in diameter although other sizes are available. The fibers are sold in a tow each of which contains five or ten thousand fibers. Consequently it is convenient to develop an electrode of the type described by taking part of the tow and placing it in a container such as housing 29 and then applying an end force to bring the fibers into intimate electrical contact with one another. However for a given size of housing the mass transfer will be diminished as the cross-section of the fibers increases because the surface area is effectively reduced.

It has also been found that carbon fibers have properties which are unexpectedly favourable to the efficiency of electrochemical processes generally. The fibers have low adsorption characteristics and tend to be free of harmful film formation at the surface of the fiber within a relatively large operating potential range. Consequently relatively high mass transfer rates can be achieved due to these properties combined with the large surface area provided by the fibers per unit of volume of the electrode.

A further property of significance is the favourable overvoltage characteristics. The hydrogen and oxygen overpotentials are large (particularly for neutral solutions) so that carbon fibers can be used both as an anode and a cathode over a considerable potential range. This makes it possible for a large number of electrochemical reactions to take place on a carbon fiber electrode.

These examples typify results obtained using carbon fiber electrodes.

Although an electrochemical diaphragm has not been used in the exemplary reactor, it will be evident that such a diaphragm can be used where a particular process demands such use. Similarly, if a reactor is to be used without continuous flow, then the electrolyte flow could be discontinued by dispensing with the inlet 56 and the outlet 24.

In some electrochemical processes the reactor described with reference to FIG. 1 may not be suitable. Some examples of other forms which could be used are shown in FIGS. 2 to 4.

Figure 2:
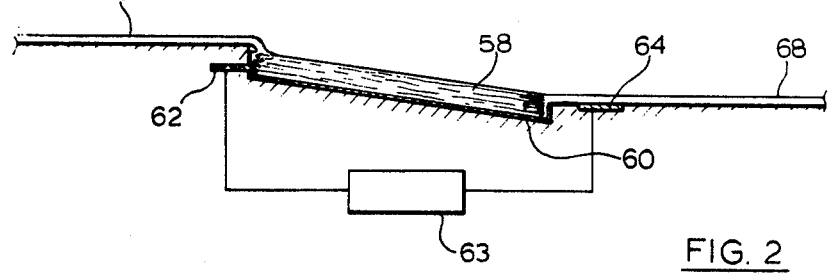
FIG. 2 is a diagrammatic representation of a cross-section through another embodiment of a reactor incorporating an electrode within the scope of the invention.

As seen in FIG. 2, a working electrode 58 is in the form of a mat made up of many carbon fibers and positioned in an inclined tank 60. Some of the fibers extend outside the tank 60 to provide a terminal 62 for connecting to a power source 63. The power source 63 is also connected to a plate counter electrode 64.

Electrolyte (which may be waste effluent or the like) runs into the tank 60 from an input stream 66 and mingles with the working electrode 58 before leaving in an output stream 68. The residence time is controlled by the volume rate of flow permitted in the flow of the input stream 66. However the rate of flow must not be too large or the carbon fiber electrode could be broken up and forced out of the tank 60.

Figure 3:
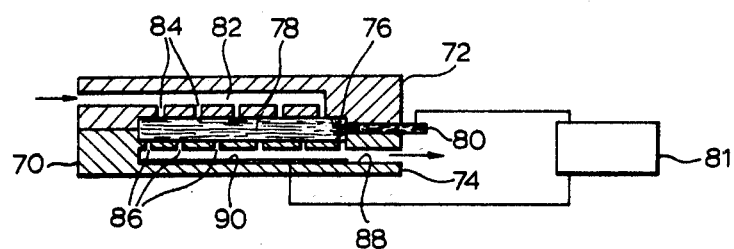
FIG. 3 is a further diagrammatic view illustrating another embodiment of an electrode.
Figure 4:
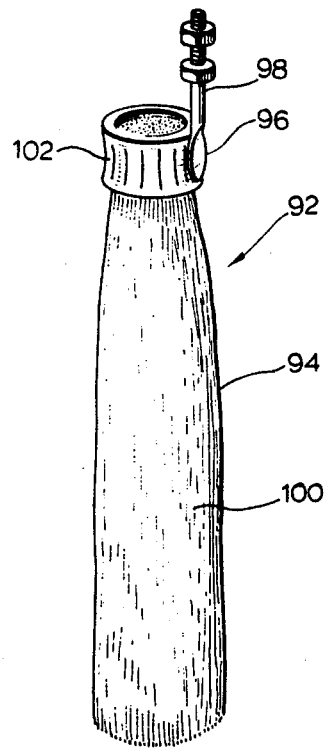
FIG. 4 is a perspective view of another electrode according to the invention.

As seen in FIG. 3, another embodiment of a reactor 70 consists of respective upper and lower halves 72, 74 which combine to define a cavity 76 in which a plurality of carbon fibers 78 are contained. These fibers lie generally in side-by-side arrangement and some of them extend outside the cavity 76 to provide a connection 80 for a power source 81 as indicated. The upper half 72 defines a manifold opening 82 for feeding electrolyte into many small openings 84 (some of which are shown) and which communicate with cavity 76. The openings 84 are small to ensure a more even flow over the electrode and to prevent all of the flow taking place at one end of the electrode.

After passing over the fibers 78, the electrolyte leaves by way of small openings 86 leading to a manifold opening 88 in lower half 74. The opening 88 contains a counter electrode 90 which is also connected electrically to the power circuit.

As previously mentioned it is well recognized that the efficiency and the accuracy of control of the electrode depend on the potential drop in the electrode and also on the surface area in contact with the electrolyte. Also, however the electrolyte should move freely through the electrode while contacting as much of the surface area of the electrode as possible. A particular form of carbon fiber electrode which is advantageous in permitting such free movement of electrolyte is shown in FIG. 4.

Examples of the use of a working electrode of the type shown generally in FIG. 3 will now be described. All electrode potentials mentioned are measured against a saturated calomel electrode.

EXAMPLE 1

A dark blue solution of copper sulphate having a concentration of 10,000 part per million (p.p.m.) was introduced to the reactor. The potential of the working electrode was held at −1.2 volts and the effluent solution was colourless indicating that the copper had been retained by the working electrode. The working electrode potential was then switched to +0.2 volts and the effluent collection was blue indicating that copper was being stripped from the working electrode.

The experiment was again repeated by feeding a solution of 10,000 p.p.m. copper sulphate to the reactor and again the effluent was colourless. Water containing some electrolytes was then introduced and the output was again colourless. With water continuing to be introduced the working electrode potential was switched to +0.2 volts and the output solution was blue indicating that copper was being stripped from the working electrode.

Each of the conversions took place in a residence time of about 12 seconds. The fact that the effluent in both cases was colourless indicates a reduction from 10,000 p.p.m. copper to less than 400 p.p.m. The residence time will vary depending to some extent on the packing of the carbon fibers.

EXAMPLE 2

A solution containing 250 p.p.m. of lead was prepared and introduced to the reactor. The effluent was collected and analysed by atomic absorption spectrophotometry. This analysis was performed utilizing a Perkin Elmer atomic absorption spectrophotometer equipped with a Mossman Furnace atomizer. The following results were obtained.

The working electrode was held at −1.2 volts. The output had a concentration of 0.2 p.p.m. lead.

The total conversion in about 12 seconds residence time was therefore 99.9% in a single pass.

EXAMPLE 3

Example 2 was repeated for copper. The working electrode had a potential of −1.2 volts and the input solution was copper sulphate. The input solution had a concentration of 250 p.p.m. copper and the output had a concentration of 4 p.p.m. copper. Thus there was a 98.4% conversion in about 12 seconds residence time in a single pass through the reactor.

EXAMPLE 4

Example 2 was repeated for nickel. Nickel chloride was used with a working potential of −1.6 volts. The input solution had a concentration of 250 p.p.m. nickel and the output had a concentration of 20 p.p.m. Thus a 92% conversion was achieved in about 12 seconds residence time in a single pass.

Preliminary studies have suggested that the electrochemical reduction of nickel at carbon fiber electrodes is dissimilar to that of the other metal reductions used in previous examples. The kinetics of the reaction are slower. This would explain the lower conversion factor of 92% in 12 seconds. A longer residence time may well achieve higher conversions in a single pass although the conversion factor is highly satisfactory considering the short residence time in the reactor.

EXAMPLE 5

Solutions containing 500 p.p.m. and 100 p.p.m. of cadmium were introduced to the reactor and the effluent was monitored by on-line automated anodic stripping voltametry. Conversions of 99% were achieved when the working electrode was at −1.4 volts.

As can be seen, the results from the examples show that efficiencies in the order of 99% with a 12 seconds residence time can be achieved. This is both because the negligible resistance of the carbon fibers allows the potential across the electrode to be controlled precisely, and also because of the high surface area to volume ratio of the electrode. Consequently, the two prime requisites of an electrode used in removing metals from solution have been used in this structure, namely a very large surface area combined with a uniform electrical potential across the area.

As seen in FIG. 4, an electrode 92 consists of a tow 94 engaged in a coupling 96 at a discrete upper end portion of the tow 94. This coupling also includes an upstanding electrical terminal 98 for connecting the electrode to an electrical power supply.

The tow 94 consists of numerous carbon fibers 100 all of which are preferably substantially the same length and which lie generally in side-by-side arrangement. Respective corresponding ends of the fibers 100 are co-terminus at the upper extremity of a ring 102 forming part of the coupling 96. This ring 102 has been deformed inwardly into firm engagement with the tow so that individual fibers within the ring are in electrical contact with one another. Consequently, because the ring is conductive, a potential applied at the terminal 98 will be transmitted by way of the ring 102 to the individual carbon fibers 100 so that the potential on each of the fibers will be substantially the same as that on all of the other fibers. Further, because the potential drop in the fibers is negligible, the potential at any point in the fibers will be substantially the same as the potential applied to the tow.

It has been found that carbon fiber electrodes of the type shown in FIG. 4 are extremely efficient due to the aforementioned properties of carbon fibers and also because of the extremely large surface area in continuous contact with electrolyte. Further in moving electrolyte the fibers tend to lie in the path of the flow to thereby ensure maximum contact time as the electrolyte flows along the fibers.

The coupling 96 can take any suitable form consistent with maintaining the fibers in their relative positions over a discrete portion of the length of the tow while also permitting a potential to be applied to fibers consistently. In fact in simple applications a binding around the tow would suffice with fibers forming part of the tow above the binding being used for the electrical connection. Consequently the coupling 96 can be generalised to be any arrangement which locates the fibers relative to one another. Although the coupling 96 includes electrical connection 98, many other arrangements can be used such as the simple binding already mentioned.

Figure 4A:
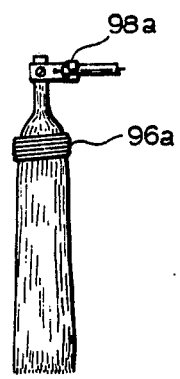
FIG. 4a is a side view of yet another electrode according to the invention.

As seen in FIG. 4a, the coupling 96 (FIG. 4) could be replaced in a simple form by a binding 96a which may or may not be electrically conductive, and by extending at least some of the carbon fibers past the binding for use in making an electrical connection 98a.

Figure 5:
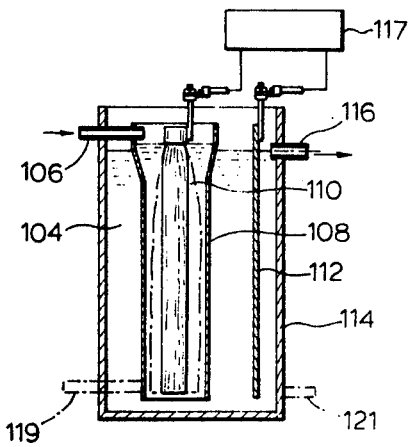
FIG. 5 is a somewhat diagrammatic sectional view of a reactor incorporating the electrode shown in FIG. 4.

A typical use of the electrode 92 shown in FIG. 4 is illustrated in FIG. 5 in which the electrode is being used for electrowinning. Electrolyte 104 is being fed through an inlet 106 so that the electrolyte initially enters an electrolyte guide 108 positioned about an electrode 110 of similar form to that described with reference to FIG. 4. The guide 108 is open at its bottom so that electrolyte can pass downwardly through the carbon fibers and then upwardly past a counter electrode 112 which is also positioned inside an electrolyte container 114. An electrolyte outlet 116 is provided adjacent the top of the container 114 and a power supply 117 is connected to the working electrode 110 and counter electrode 112.

In use, the individual fibers are free to flex in the stream of electrolyte as this electrolyte moves downwardly through the guide 108. Consequently, there is a tendency for the fibers to lie individually in the electrolyte due to flow effects around the fibers. The tow will then take up a position somewhat as that indicated in ghost outline in FIG. 5. Because of this movement in the tow, it is preferable that the guide 108 be non-conductive because it must be sufficiently close to the tow to ensure that the electrolyte flow effects the tow. Further, as metal is deposited on the fibers due to the electrochemical process, the flow will tend to maintain the separation between fibers within limits of flow rate and weight of fibers.

Although the processes shown in FIG. 5 demonstrates the use of the fibers in electrowinning, it will be evident that a reactor such as that shown in FIG. 5 can be used in effluent treatment and control, and electro-organic synthesis with or without conventional modifications to the reactor such as the use of electrochemical diaphragms, and a third or reference electrode. For instance the guide 108 could be an electrochemical diaphragm in which case the bottom of the guide would be closed and an outlet 119 used as indicated in ghost outline. Similarly an electrochemically compatible liquid would be fed into an inlet 121 (also shown in ghost outline) and this liquid would leave by way of outlet 116.

Figure 6:
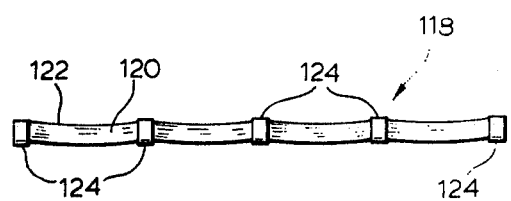
FIG. 6 is an elevation of yet another embodiment of an electrode.

Reference is now made to FIG. 6 which shows yet another form of electrode 118. This electrode consists of a tow 120 made up of numerous carbon fibers 122 which are restrained in five discrete positions along the length of the fibers by couplings 124. The same potential is provided at each of the couplings so that the longest electrical path is from a particular coupling to the mid point of the carbon fiber between this coupling and an adjacent coupling.

Figure 7:
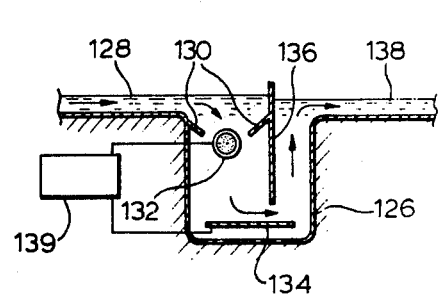
FIG. 7 is a sectional view of a reactor using the electrode shown in FIG. 6.

The electrode shown in FIG. 6 is conveniently used in a reactor 126 shown in FIG. 7. In this reactor electrolyte 128 is flowing into the reactor and is guided by baffles 130 towards the working electrode 132 of the form shown in FIG. 6. This electrode lies transversely of the direction of travel and the tow is slightly loose between the couplings 124 to provide minor transverse oscillation of the fibers as the electrolyte flows across the fibers. Subsequently the electrolyte moves downwardly leaving the electrode 132 and passes a counter electrode 134 under a major vertical baffle 136 which ensures that the electrolyte first moves downwardly towards the counter electrode and upwardly back into a stream 138. As illustrated, a suitable power supply 139 is provided.

The main use of electrochemical reactors is in continuous processes where the electrolyte is changed continuously as was described with reference to FIGS. 5 and 7. However, in a reactor in which the electrode is not changed, there would be no need to use a guide such as the electrolyte guide 108 of FIG. 5. In such an embodiment, the electrode 110 would have to be spaced from the counter electrode 112 sufficiently to prevent a short circuit. Otherwise, the structure would be similar to that shown in FIG. 5 with the exclusion of the electrolyte guide 108. Similarly, in a process such as that shown in FIG. 7 it would be possible to use a bath in which the electrodes were contained, and after filling the bath, the flow would be curtailed and the electrochemical process allowed to take place. Subsequently, the electrolyte would then be removed from the bath and a further charge of electrolyte entered into the bath. In such a system the baffles 130 and main baffle 136 could be eliminated, although of course the arrangement of electrodes could also be changed because the reason for their location in FIG. 4 is no longer pertinent.

Although several forms of electrode have been described, numerous other forms are possibly consistent with the use of carbon fibers. Such other forms are within the scope of the inventive concept as described and claimed.

Throughout the description, the counter electrode and the electrolyte container have been shown as separate elements. It is intended that such an arrangement when described and claimed will include the equivalent structure (where applicable) of a container which either doubles as an electrode or which includes such an electrode in the structure of the container.

What we claim is:

1. An electrochemical reactor comprising:
   a container having means defining at least one inlet and at least one outlet and including means defining an electrolyte flow path between the inlet and the outlet;
   a working electrode positioned in the electrolyte flow path, the electrode being of a plurality of carbon fibers arranged in a group with each fiber being generally in side-by-side relationship with other fibers so that each fiber makes numerous electrical connections by contact with other fibers over the length of the fiber and such that the group of fibers exhibits a significant thickness in all directions measured perpendicularly of each fiber so that in use electrolyte must take a tortuous path through the group of carbon fibers, each of the fibers having a relatively good electrical conductivity and having a very small maximum thickness compared with the length of the fiber, the length being such that the fibers individually exhibit no significant resistance to transverse deflection, and means coupled to at least some of the fibers electrically for establishing an electrical potential substantially throughout the electrode; and
   a counter-electrode positioned in the container and spaced from the working electrode.

2. An electrochemical reactor as claimed in claim 1 in which said means defining an electrolyte flow path comprises a non-conductive housing containing the carbon fibers.

3. An electrochemical reactor as claimed in claim 2 in which the housing further includes means creating a compressive load on the carbon fibers whereby the carbon fibers are more positively packed in the housing.

4. An electrochemical reactor as claimed in claim 1 in which the means defining the electrolyte flow path is an electrochemical diaphragm.

5. An electrochemical reactor as claimed in claim 1 and further comprising an electrochemical diaphragm positioned in the container to divide the container into a part containing the working electrode and a second part containing the counter-electrode.

* * * * *

UNITED STATES PATENT OFFICE
CERTIFICATE OF CORRECTION

Patent No. 4,108,754　　　　　　　　　　Dated August 22, 1978

Inventor(s) Bernard Fleet & Sankar Das Gupta

It is certified that error appears in the above-identified patent and that said Letters Patent are hereby corrected as shown below:

Title page, column 1, insert after [22]

[30] Foreign Application Priority Data

August 7, 1974　　United Kingdom　34770/74

November 5, 1974　United Kingdom　49553/74

Signed and Sealed this

Twenty-fourth Day of June 1980

[SEAL]

*Attest:*

*Attesting Officer*　　　　　　　SIDNEY A. DIAMOND

*Commissioner of Patents and Trademarks*